(No Model.)
P. R. GRAY.
METHOD OF CLEANSING OR REVIVIFYING BONE BLACK.
No. 309,222. Patented Dec. 16, 1884.
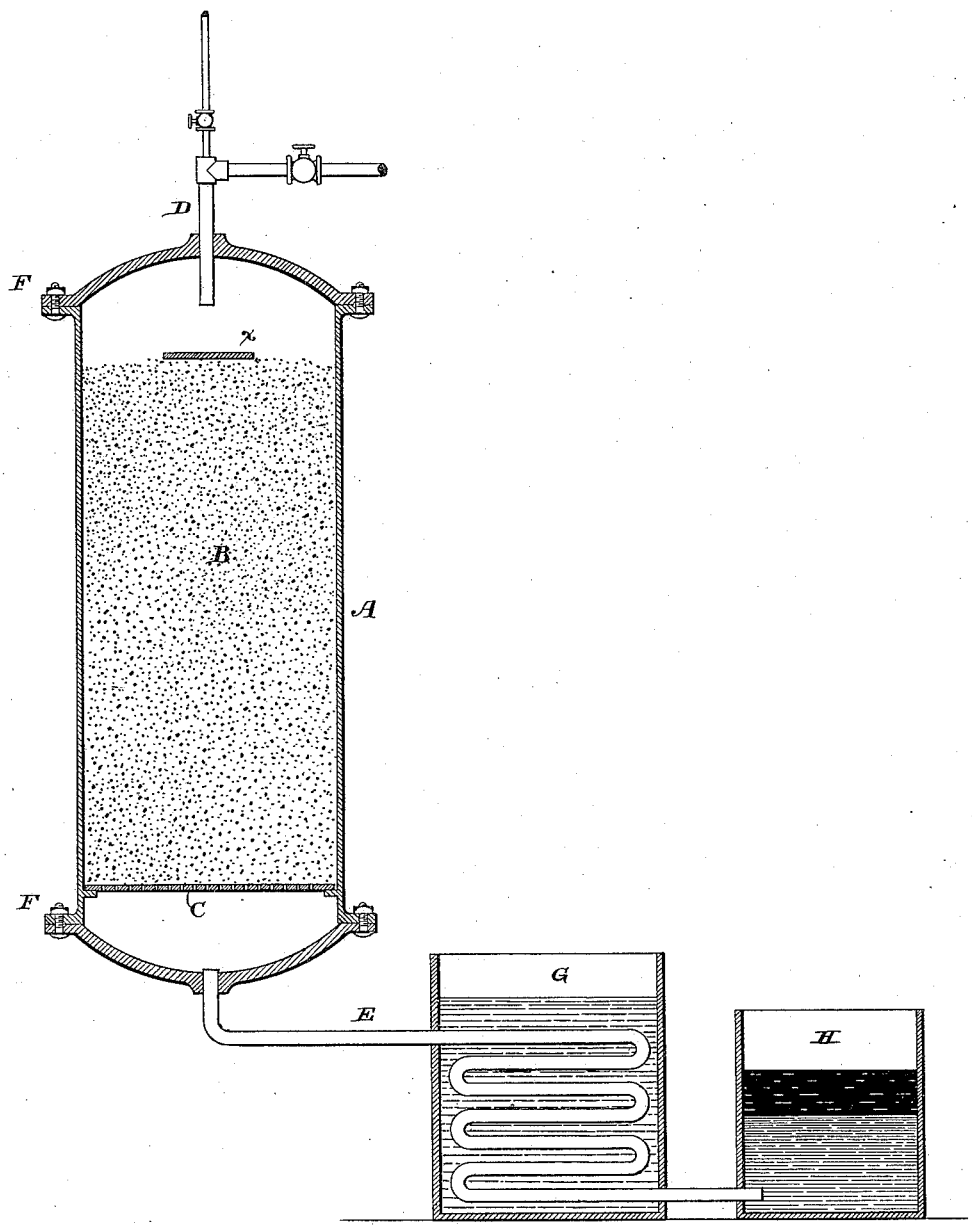
WITNESSES
Wm A. Skinkle
Henry A. Lamb
INVENTOR
Philander R. Gray
By his Attorneys
Baldwin, Hopkins, & Peyton

UNITED STATES PATENT OFFICE.

PHILANDER R. GRAY, OF FRANKLIN, PA., ASSIGNOR TO THE ECLIPSE LUBRICATING OIL COMPANY, (LIMITED,) OF SAME PLACE.

METHOD OF CLEANSING OR REVIVIFYING BONE-BLACK.

SPECIFICATION forming part of Letters Patent No. 309,222, dated December 16, 1884.

Application filed October 18, 1882. (No model.)

*To all whom it may concern:*

Be it known that I, PHILANDER R. GRAY, of Franklin, in the county of Venango and State of Pennsylvania, have invented a certain new and useful Method of Cleansing or Revivifying Bone-Black, of which the following is a specification.

My invention relates more particularly to the cleansing of bone-black used in oil-filters.
To accomplish this object I employ superheated steam, which I admit at the top of the filter after the bone-black has become saturated with oil, so as to destroy or materially diminish its efficiency as a cleansing medium. In these filters, which are ordinarily of quite large size—say about eighteen inches in diameter and ten or twelve feet in height—a large quantity of bone-black is required to fill them and provide them properly for the work of filtering. After use for a certain period the bone-black not only absorbs some waste material in cleansing the oil, but also absorbs a large per cent. of the oil itself, and thus becomes unfit for filtering purposes.
The object of my invention is to thoroughly cleanse the bone-black from carbon or other foreign matters, and also to remove the oil which it has absorbed and save it without removing the bone-black from the filter-cylinder.

Another object of my invention is to effect this cleansing and removal of the oil with great rapidity and thoroughness. Accordingly I employ superheated steam, say, of a temperature of 900° Fahrenheit, or thereabout, which I have found will accomplish the work satisfactorily in a short period when employed in connection with the instrumentalities I have illustrated in the accompanying drawing; but I do not claim to be the first to suggest the use of superheated steam, broadly, for cleansing bone-black in filters, as I am aware that the same suggestion, in connection with certain apparatus for carrying it out, is made in the patent of R. S. Jennings, No. 239,962, of April 12, 1881, and my invention is therefore limited to my improved apparatus for cleansing bone-black in filters.

In the accompanying drawing I have illustrated a filter in vertical section, A representing the cylinder; B, the bone-black filling; C, the perforated false bottom, and D an oil and steam inlet pipe, to be connected with a steam-generator; E, an exit-pipe; F, bolts and flanges for securing the top and bottom to the filtering-cylinder; G, a cooling-tank or condenser, and H a receiving-tank for the oil, &c.

In order to render the operation of the superheated steam more effective and prevent its boring through the filtering material, I prefer to employ a metal plate, $x$, resting on top of the filtering material, immediately under the end of the steam and oil pipe, against which the steam impinges when it is forced into the filter, and is diverted and distributed so as to act upon the filtering material with an approximately uniform pressure throughout. The result is that the steam, oil, and carbon, or other matter to be removed from the bone-black by the action of the superheated steam, will escape through the exit-pipe into the cooling coil in the condenser and thence into the receiving-tank. The oil, being lightest, will float upon the top and can be conveniently removed and saved. This mode of cleansing and revivifying bone-black within oil-filters without the trouble of removing it results in material economy, and it may be practiced several times upon the same charge of bone-black before it will become deteriorated for filtering purposes.

Having thus described my invention, what I claim as new, and desire to secure by Letters Patent, is—

In combination with an oil-filtering vessel, A, the oil and steam inlet pipes at the top, the plate $x$, and the exit-pipe at the bottom for cleansing filtering material by superheated steam without removing it, substantially as set forth.

In testimony whereof I have hereunto subscribed my name this 9th day of October, A. D. 1882.

PHILANDER R. GRAY.

Witnesses:
MARCUS S. HOPKINS,
JAMES YOUNG.